Patented May 5, 1942

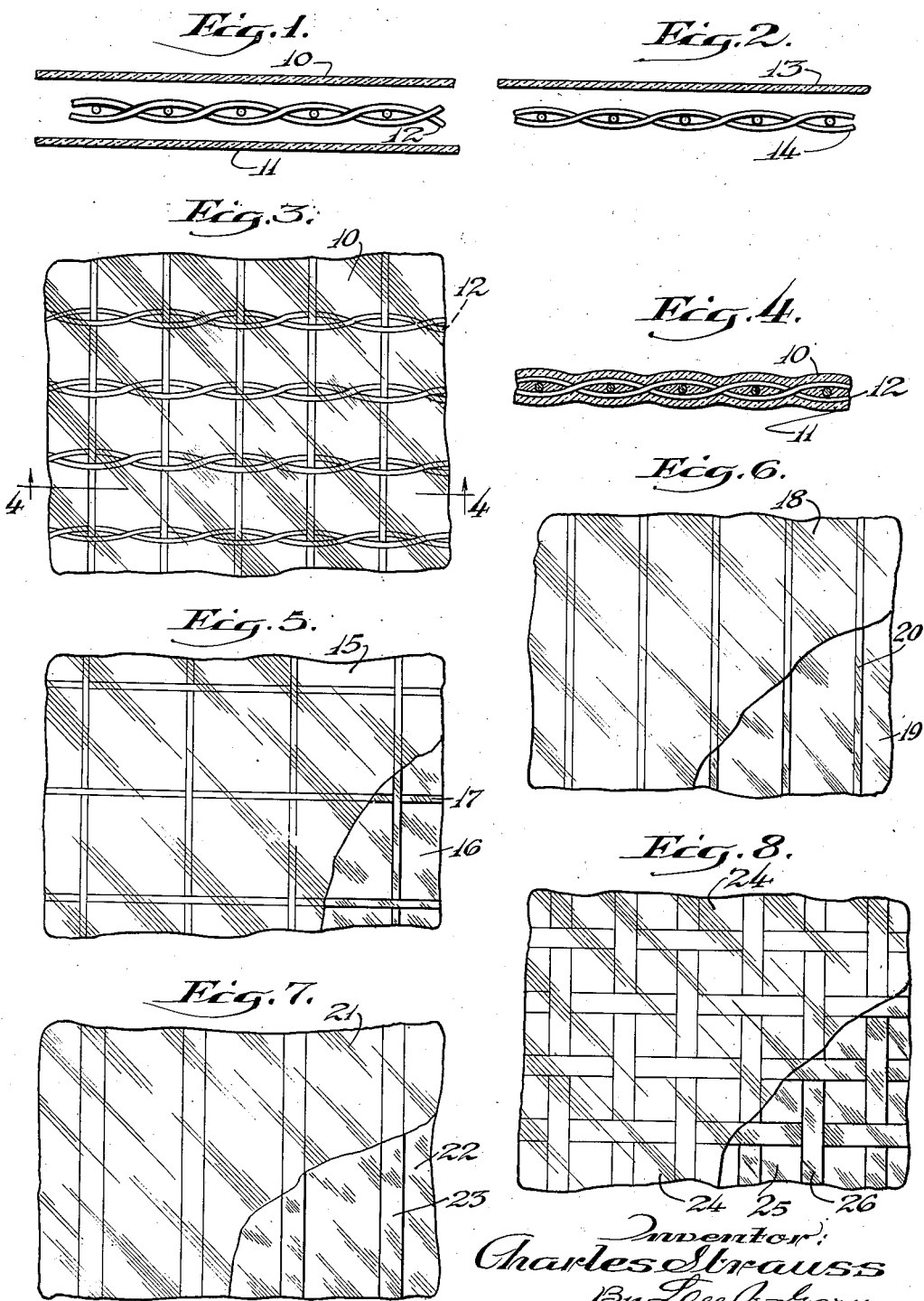

2,281,635

UNITED STATES PATENT OFFICE 2,281,635

PLASTIC FILM MATERIAL

Charles Strauss, Chicago, Ill., assignor to Arvey Corporation, Chicago, Ill., a corporation of Illinois Application August 7, 1941, Serial No. 405,827

6 Claims. (Cl. 154—46)

This invention relates to improvements in composite or laminated film material, and particularly to translucent or transparent films of reinforced construction formed wholly of plastics.

Film materials formed of a wide variety of plastics and their manifold uses and wide commercial acceptance are well known, particularly for wrapping, covering or packaging. However, in order to employ plastics in the form of translucent, and particularly transparent flexible films, such films must be extremely thin and as a result they have little tensile strength and most of them are subject to rapid tearing on being cut or punctured. Although these plastic films per se are eminently suitable for many well known uses, yet by reason of their use in such thin films and resultant weaknesses their use in many instances is unsatisfactory, and on the other hand are not used at all for many purposes to which they might be desirably adapted.

It is therefore an object of this invention to provide flexible, translucent or transparent film material composed of plastics, the material being of composite or laminated construction and of increased tensile strength and of sharply reduced or substantially eliminated tendency to spreading of ruptures, with the result of greater economy and efficiency in the use of such film materials and the opening up of wider fields of commercial application.

The invention is particularly characterized by the provision of a composite film wherein both the surfacing film material and reinforcement therefor are formed of plastics, the composite having greater tensile strength and tear resistance than an unreinforced plastic film of the same mass and composition.

Other objects relate to details of construction, component materials and particular attendant advantages, benefits and utilities, which will be apparent from a consideration of the following specification and drawing, wherein:

Fig. 1 is an enlarged diagrammatic section of the components of one form of my invention.

Fig. 2 is a view similar to Fig. 1 of one modification of my invention.

Fig. 3 is a diagrammatic fragmentary face view of my composite plastic film formed of the components illustrated in Fig. 1.

Fig. 4 is a section on the line 4—4 of Fig. 3.

Fig. 5 is a diagrammatic fragmentary face view, with parts broken away, of another form of my invention.

Fig. 6 is a view similar to Fig. 5 of another modified form of my invention.

Fig. 7 is a view similar to Fig. 5 of another modified form of my invention.

Fig. 8 is a view similar to Fig. 5 of another modified form of my invention.

In general my composite plastic film material comprises one or two opposed surface layers of translucent or preferably transparent thin flexible film material formed of plastics well known in the art, such as regenerated cellulose, cellulose esters such as cellulose acetate or nitrate, cellulose ethers such as ethyl cellulose, rubber hydrohalides such as rubber hydrochloride, polystyrene, methacrylate compounds, vinyl compounds such as polymerized vinyl chloride or acetate or their co-polymers, and the like materials.

To a film of such materials, or between a pair of such films formed of the same or different plastics, I adhere or bond a reinforcing strata also formed of a plastic material, and which likewise may be formed of the same or a different plastic. This reinforcing strata however is not in the form of a continuous sheet but rather of an open nature, such as for example, an apertured film, an open woven or braided mesh structure formed of non-fibrous cut or extruded strips or strands, or merely such strips or strands laid longitudinally, transversely, obliquely or even heterogeneously.

Thus, referring to the drawing, Figs. 1, 3 and 4 illustrate a composite reinforced film formed of two surface layers 10 and 11 of plastic film material, and a reinforcing strata 12. This reinforcing strata 12, as more particularly set forth in my co-pending application, Serial No. 405,826 filed August 7, 1941, comprises non-fibrous plastic strands woven in the form of a mesh having crossed warp strands. These three units, that is, the films 10 and 11, with the mesh strata 12 between them, are bonded together to form a single unit, as diagrammatically illustrated in the section of Fig. 4 to provide a plastic composite, preferably by the aid of a pressure sensitive or heat and pressure sensitive adhesive.

The modified form of Fig. 2 is diagrammatically illustrative of a plastic composite formed of a single facing film 13 and reinforcing strata 14. Although in the illustration, the reinforcing strata 14 is similar to the strata 12 of Figs. 1, 3 and 4, it may be in the form of other reinforcements herein set forth generally.

Fig. 5 illustrates another modified form composed of the opposed surface films 15 and 16 having a reinforcing strata 17 between them. This reinforcing strata may be as illustrated in the form of non-fibrous plastic strands woven in the form of an open mesh. On the other hand, in the modification shown in Fig. 6 composed of the films 18 and 19 with the reinforcing strata 20 between them, the reinforcing strata is composed of non-woven plastic spaced strands, which may extend longitudinally or transversely.

Fig. 7 illustrates a composite structure formed of the films 21 and 22 between which is the reinforcing strata 23 formed of spaced apart parallel plastic strips. Similarly the modification of Fig. 8 shows surface films 24 and 25 having between them the reinforcing strata 26 formed of woven strips of plastic material.

From the foregoing it will be understood that the reinforcing strata may be formed in various manners, and may even comprise a heterogeneous or some other symmetrical arrangement of non-fibrous strands or strips bonded to a surface film or between an opposed pair of surface films.

For the purpose of bonding the reinforcing strata to or between the surface films various adhesives or bonding agents may be used, and one group may be those known in the art for bonding relatively smooth non-absorptive surfaces together, such as those used in the glass laminating art, or plastic film laminating art. Such adhesives, by way of illustration and not limitation, may comprise polymerized vinyl acetate, chloride, or their co-polymers, chlorinated rubber or rubber-resin compositions, cellulose esters and ethers, and other various thermoplastic resins, gums, rubber compositions and the like materials, it being understood that these materials may be modified and compounded with materials such as solvents, softeners, plasticizers, etc., and used in the form of pressure sensitive adhesives requiring only pressure, or in the form of thermoplastic adhesives requiring pressure and heat above atmospheric.

In one specific method the surfacing film material is coated with a solvent solution of the adhesive, the solvent evaporated and the layers bonded together with the reinforcing strata between them, by pressure or pressure and heat. The laminating operation may be carried out by platens, or preferably in a continuous operation by feeding the surfacing material from continuous rolls and simultaneously inserting the reinforcing strata between them either by hand, or from one or more rolls, dependent on the nature of the reinforcing strata, and laminating the composite structure between pressure rolls, which may include one or more heated rolls when required by the character of the adhesive used or the materials being composited. The adhesive or bonding agent may, in addition to being selected for its suitability or compatability with the specific plastics composited, be selected for its transparency or translucence, and moisture resistant qualities.

The reinforcing strata may be selected for functions other than or supplemental to that of reinforcement. Thus for example in forming my composite material the surfacing films may be transparent, and the reinforcing strata may be colored to provide a decorative effect, which is especially suitable for use in furniture or automobile seat coverings, shades, screens, and the like, and for such purposes, the surfacing films may be suitably colored. Likewise by reason of use of the reinforcing strata, and with suitable selection thereof, the composite material, being thermoplastic may be given an induced or set shape and thus render it more suitable for covering shaped objects, or for use as bags or containers, or to provide fixed fold lines by means of which such bags or containers may be readily collapsed when not in use.

For use as screen material or window pane substitute it is preferable to make use of cellulose acetate as the surface film material so as to permit maximum passage of ultra-violet rays and in keeping with this strips or strands of non-woven cellulose acetate may be utilized as the reinforcing strata, and clear polymerized vinyl acetate as the adhesive base.

For use in such screen material, and in any other use of my novel composite material where high tensile strength is desired, I preferably use non-fibrous strands of vinylidene chloride in the form of its polymerized thermoplastic resins in forming the reinforcing strata. Since this plastic has a tensile strength of from about 30,000 to 60,000 pounds per square inch, I may use relatively thin thread-like strands having a high degree of flexibility and well spaced so as to without impairment of transparency or light ray transmission.

It will thus be seen that my novel composite material formed wholly of plastics, and particularly the use of non-fibrous strands of plastics as the reinforcing material, permits the use of plastic film material under stress and shaping thereof, and thus forms a serviceable item that has good handling qualities and can stand up under commercial usage and for purposes not hitherto available. As compared to textile reinforcement, my reinforcement strands can provide smaller bulk, weight and thickness; no appreciable reduction of the translucent or transparent qualities of the surface film results; and the tendency to deterioration and delamination of the composite material due to climatic conditions by absorption of moisture which results from the use and capillary qualities of fibrous textile or synthetic threads is retarded or entirely prevented.

It will be understood from the foregoing that the term "strands" as used in the following claims with reference to the reinforcing strata is intended to include either cut, extruded or otherwise formed flat or round non-woven strips or strands of plastic material of any caliper thickness, and that the plastic material of either the reinforcing strata or the surfacing films may be either translucent or transparent. By the term "open fabric" as employed herein is meant a strata made up of strands of substantial length, at least certain of which are spaced laterally from each other a distance which is large relative to the width of the strands so as to provide openings between adjacent strands irrespective of whether the strands are interwoven or intersecting or formed integral with each other.

I claim as my invention:

1. A laminated translucent or transparent composite film material comprising a pair of opposed surface plastic films and a substantially co-extensive reinforcing strata formed of an open fabric of non-fibrous plastic strands, said strata being bonded between said films and said films being bonded together in the openings between the said strands.

2. A laminated translucent or transparent composite film material comprising a pair of opposed surface cellulose acetate films and a substantially co-extensive reinforcing strata formed of an open fabric of non-fibrous cellulose acetate strands, said strata being bonded between said films and said films being bonded together in the openings between the said strands.

3. A laminated translucent or transparent composite film material comprising a pair of opposed surface plastic films and a substantially co-extensive reinforcing strata formed of an open fabric of non-fibrous vinylidene chloride strands, said strata being bonded between said films and said films being bonded together in the openings between the said strands.

4. A laminated translucent or transparent composite film material comprising a pair of opposed surface cellulose acetate films and a substantially co-extensive reinforcing strata formed of an open fabric of vinylidene chloride strands, said strata being bonded between said films and said films being bonded together in the openings between the said strands.

5. A laminated translucent or transparent film material comprising a pair of opposing surface plastic films and a substantially co-extensive reinforcing strata formed of an open woven or braided mesh fabric of non-fibrous plastic strands, said strata being bonded between said films and said films being bonded together in the openings between the said strands.

6. A laminated translucent or transparent composite film material comprising a pair of opposed surface cellulose acetate films and a substantially co-extensive reinforcing strata formed of a woven or braided mesh fabric of non-fibrous strands of vinylidene chloride, said strata being bonded between said films and said films being bonded together in the openings between the said strands.

CHARLES STRAUSS.